United States Patent [19]

Alexander et al.

[11] Patent Number: 5,579,191
[45] Date of Patent: Nov. 26, 1996

[54] PRISM FOR A DATA CARTRIDGE

[75] Inventors: Jerry L. Alexander, St. Paul Park; Kevin N. Biffert, Moorhead, both of Minn.; Jerome V. Gagnier, Wahpeton, N. Dak.; Thiruppathy Srinivasan, Wahpeton, N. Dak.; Viet N. Tran, Wahpeton, N. Dak.

[73] Assignee: Minnesota Mining and Manufacturing Company, St. Paul, Minn.

[21] Appl. No.: 503,233

[22] Filed: Jul. 17, 1995

[51] Int. Cl.⁶ .......................... G11B 23/087; G11B 15/18; G03B 23/02; G02B 5/04
[52] U.S. Cl. .......................... 360/132; 242/344; 359/833
[58] Field of Search .......................... 360/74.6, 132; 242/344, 347; 359/831, 833

[56] References Cited

U.S. PATENT DOCUMENTS

| | | | |
|---|---|---|---|
| 2,154,360 | 4/1939 | Scheel et al. | 359/833 |
| 3,860,329 | 1/1975 | Baker et al. | 359/833 |
| 4,235,515 | 11/1980 | Sheiman et al. | 359/833 |
| 4,607,299 | 8/1986 | Oishi et al. | 360/60 |
| 4,665,456 | 5/1987 | Ahlberg et al. | 360/132 |
| 4,763,217 | 8/1988 | Oishi | 360/132 |
| 4,783,022 | 11/1988 | Onmori et al. | 360/132 |
| 4,862,305 | 8/1989 | Katagiri et al. | 360/132 |
| 5,056,892 | 10/1991 | Cobb, Jr. | 359/831 |
| 5,121,275 | 6/1992 | Komiyama | 360/132 |
| 5,311,030 | 5/1994 | Higuchi et al. | 360/132 |
| 5,335,131 | 8/1994 | Sato et al. | 242/347 |

FOREIGN PATENT DOCUMENTS

| | | |
|---|---|---|
| 0499400 | 8/1992 | European Pat. Off. . |
| 62-219384 | 9/1987 | Japan . |
| 62-219385 | 9/1987 | Japan . |
| 63-317995 | 12/1988 | Japan . |
| 1-102449 | 4/1989 | Japan .................... 359/833 |
| 5-109235 | 4/1993 | Japan . |
| 5-225751 | 9/1993 | Japan . |
| 5-225750 | 9/1993 | Japan . |
| 5-225752 | 9/1993 | Japan . |

*Primary Examiner*—Jefferson Evans
*Attorney, Agent, or Firm*—Gary L. Griswold; Walter N. Kirn; Charles L. Dennis, II

[57] ABSTRACT

A prism is provided for deflecting light through the tape information holes in the tape of a data cartridge. The prism includes a substantially hollow main prism body. The inside surface of the angled prism surface is formed in steps, so that light passing into the angled portion passes in the normal direction through a step, is reflected off of the angled surface, and then passes in the normal direction through the adjacent side of the step, or the adjacent side of the next step. In this fashion, minimal plastic material is required for the prism, while light reflection is restricted to only a single surface. An alternative embodiment provides steps on the internal surface of a mirror, instead of a prism.

15 Claims, 3 Drawing Sheets

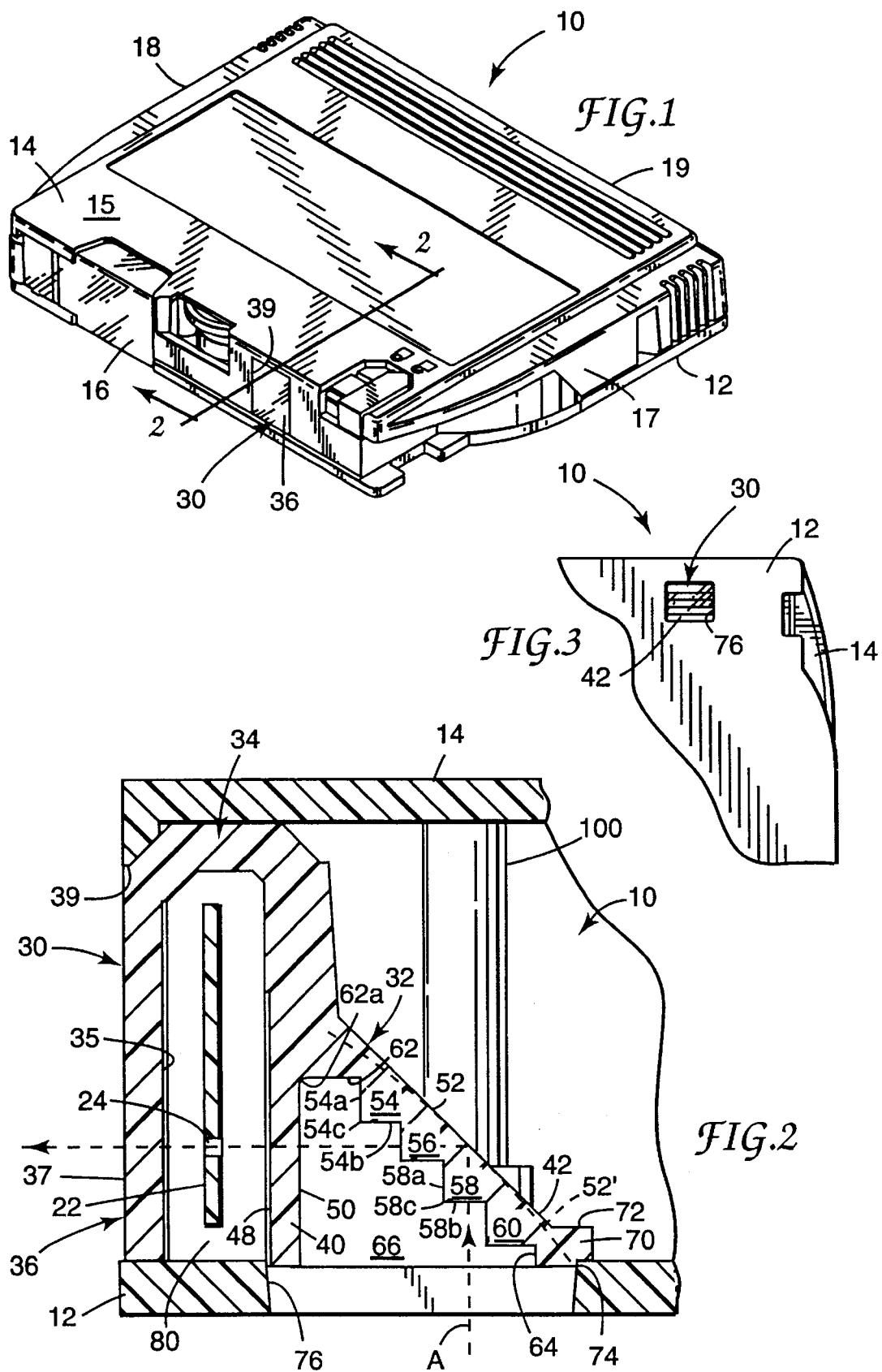

PRISM FOR A DATA CARTRIDGE

BACKGROUND OF THE INVENTION

1. Field of the Invention

The present invention relates to reflective mechanisms for deflecting light through a tape in a data cartridge.

2. Description of the Related Art

Tape in a data cartridge often is provided with holes to serve as codes to the drive in which the data cartridge is to be used. For example, the holes may indicate that the drive has reached the end or beginning of the tape, is nearly at the end or beginning of the tape, or may identify the exact type and length of tape in the cartridge inserted in the drive. The tape itself normally is opaque, and drives usually are provided with a light source and light detector to detect the presence or absence of such holes. Normally, the light is positioned above or below the cartridge and the detector to the front of the cartridge. The light shines through the top of the cover (which typically is transparent) or through a window cut through the metal baseplate of the data cartridge. It then reflects off of a mirror to redirect it about 90° onto the tape. When the tape has a hole in it, the light passes through the hole and out through the front of the transparent cover, where it is detected by a photocell in the drive. In addition, the tape sometimes has multiple holes across its width, and a drive must be able to accurately determine the number of holes based on the amount or position of the light coming through the holes.

In some applications, a prism is substituted for the mirror. For example, co-pending U.S. patent application Ser. No. 08/346,777, filed Nov. 30, 1994, and titled "Prism for a Data Cartridge" describes a potential prism structure. Published European Patent Application 0 499 400 (Minnesota Mining and Manufacturing Company) describes another structure using a prism instead of a mirror, and notes various advantages to using a prism over a mirror.

In some applications, using a prism can pose problems. In certain cartridges, light usually is directed up through the bottom of the cartridge, then angled towards the tape (by the prism or a mirror) and detected at the front of the cartridge after passing through a hole in the tape. However, at least one drive manufacturer routinely directs the light backwards, that is, first shining it through the holes in the tape, then having it reflected toward the bottom of the cartridge, and then detecting it at the bottom of the cartridge. Moreover, the light source and the detector are off-center from the prism in the direction of tape travel. This technique works adequately when the cartridge uses a mirror to angle the light. However, it may cause problems if a prism is used due to extra reflections, e.g., from the sides of the prism, which can be detected as a phantom pulse. This is a problem especially in accurately detecting whether a single hole or multiple holes are present on the tape.

Co-pending U.S. application Ser. No. 08/429,427, filed Apr. 27, 1995, and titled "Prism for A Data Cartridge" describes a solution to this problem, namely, frosting portions of the prism surface from which reflection is not desired.

Frosted or not, a prism still has problems because it requires a fairly high mass of material. Specifically, the main body of the prism must be filled with material. This has several disadvantages:

First, the mere presence of more material increases the cost. It also usually takes longer to solidify, resulting in a long cycle time in a casting mold.

Second, most such prisms are produced by molding. Many types of thermoplastics are subject to shrinkage during solidification. Large masses of plastic tend to develop sinks. Depending on the location of the sink, this may affect, or even destroy, the desired optical characteristics of the prism.

These problems due to the mass of the prism body are avoided by using a mirror, e.g., as taught in Japanese Published Patent Applications Nos. 5-225,750, 5-225,751 and 5-225,752. However, mirrors have their own problems. It is difficult to make a mirror in which the mirror is silvered on the side closest to the tape. Primary reflection therefore usually is from the side the mirror away from the tape. This means that the light must pass through the front surface of the mirror before striking the primary reflecting surface, then return through the front surface of the mirror in its passage. Unfortunately, the front surface of the mirror also usually is angled, so it provides secondary reflectance. This results in the same phantom pulse problem noted with some prisms above.

SUMMARY OF THE INVENTION

These and other problems of the prior art are avoided according to the present invention by providing multiple mini prisms instead of one large prism. Specifically, the main body of the prism is left hollow, instead of being filled with material. The side of this empty space closest to the tape is simply a vertical wall. Light therefore passes through it in the normal direction, minimizing reflectance from it. The side opposite from this wall, which would be an angled surface on a mirror, is instead a stepped surface. Light therefore passes through the step surface in the normal direction, again minimizing reflection. The light then is reflected on the angled primary reflecting surface of the prism, and then exits through the other side of the step (or the next step), normal to the step surface.

With this design, the only angled surface the light usually will strike is the intended primary reflecting surface. All other surface interactions are normal to the surface, so that there will be no significant undesired reflection.

Preferably, the main prism body is closed with sides. One or both of these sides also can have stepped shoulders, but with angled surfaces instead of perpendicular ones. In this fashion, the light will enter the step through a surface which is near the normal direction, but then be reflected within the stepped shoulder and not be able to escape again.

Preferably, the outside of one or both of the prism sides have similar angled steps.

Preferably, all of the portions of the prism from which reflection is not desired can also be frosted.

Finally, the reflecting surface of the prism preferably has a slight concave curve to it. Such curve will help focus the incoming light toward the detector, if any scattering is occurring.

BRIEF DESCRIPTION OF THE DRAWINGS

The invention will be described further with reference to the following figures in which:

FIG. 1 is a three-quarters perspective view of a data cartridge according to the present invention.

FIG. 2 is a view in partial section along line 2—2 in FIG. 1.

FIG. 3 is a partial bottom view of the data cartridge of FIG. 1, showing the window in the base plate.

DETAILED DESCRIPTION OF THE PREFERRED EMBODIMENTS

Figure 4:
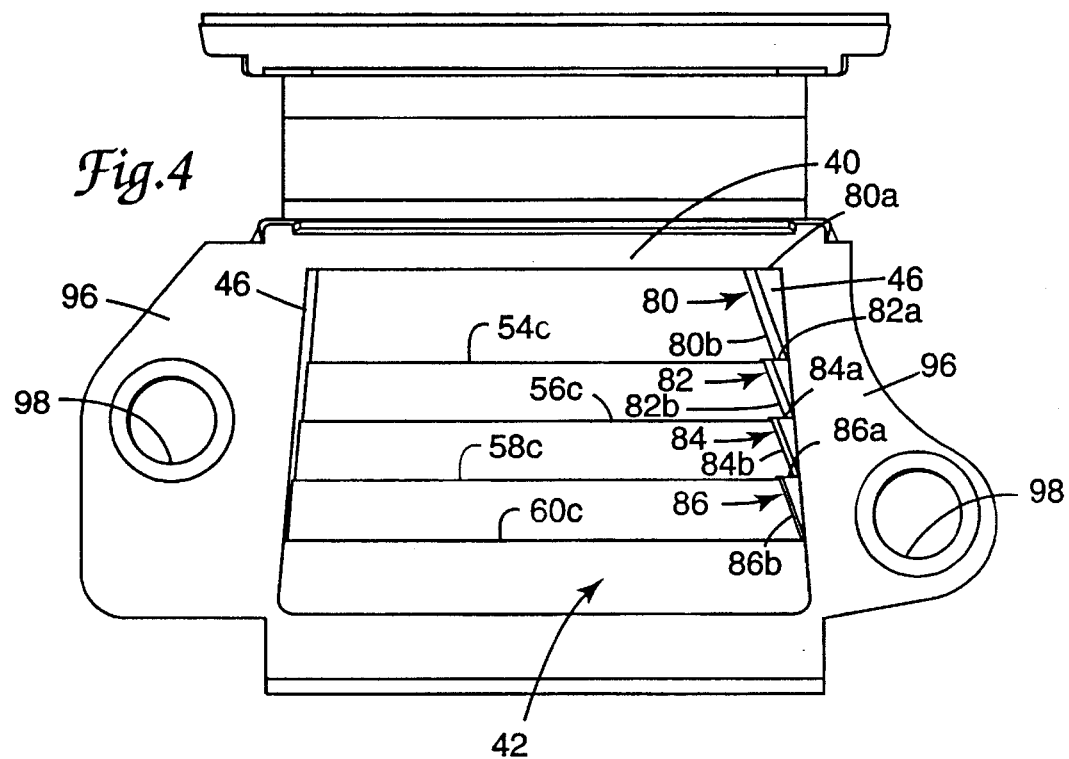
FIG. 4 is a bottom plan view of the prism of the data cartridge of FIG. 1.

In FIG. 1, a data cartridge 10 includes a base plate 12 and a cover 14 having top, front, left, right and back sides 15–19, respectively. The base plate 12 and cover 14 assemble to form a data cartridge shell. The shell contains the various components of the data cartridge, for example, tape 22 (visible in FIG. 2). The tape 22 sometimes includes holes 24 at various locations thereon, which a drive using the data cartridge 10 must be able to detect.

A combination prism and window piece 30 is provided for inclusion in the data cartridge. The prism 30 is formed of a transparent material, usually plastic, and generally includes three parts: a main prism body 32, a bridge portion 34, and a window portion 36, as best seen in FIG. 2. Both faces 35, 37 of the window portion 36 are optical quality surfaces, and the window portion 36 preferably closes off an opening 39 in the cover 14.

The main prism body 32 includes a front part 40 and a rear part 42. It also includes sides 46 (best seen in FIGS. 4 and 5).

The front part 40 has a front or external face 48 and a rear or internal face 50 which are generally approximately parallel to the tape 22, approximately perpendicular to the base plate 12 and are optical quality surfaces.

The rear portion 42 includes an angled rear or external surface 52, which may be silvered if desired. The rear surface 52 is angled at greater than the critical angle of reflection relative to the center axis of the incident portion of the light path A. Preferably, the rear surface 52 is angled at approximately a 45° angle. The front or internal surface of the rear portion 42 is formed into a series of steps 54, 56, 58, 60. Each step 54, 56, 58, 60 has a first flat face 54a, 58a which is substantially normal to the center line of the horizontal portion of the light path A, i.e., roughly parallel to the tape 22 and perpendicular to the base plate 12. Each step also has a second flat face 54b, 58b which is substantially normal to the center line of the vertical portion of the light path A, i.e., roughly parallel to the base plate 12. The corners 54c, 58c should be as sharp as reasonably practicable given molding techniques, e.g., a radius of approximately 0.001 inch (25 μm) or less. (Steps 56, 60 have analogous faces and corners, but the corresponding reference numerals have been omitted from the drawings for clarity of illustration.) Surface 62 should be substantially normal to the vertical portion of the light path A, i.e., roughly parallel to base plate 12. Surface 64 should be substantially normal to the horizontal portion of the light path A, i.e., roughly parallel to tape 22 and perpendicular to base plate 12. Together, surfaces 54, 56, 58, 60, 62, 64 and sides 46 define a hollow cavity 66 within the main prism body 32. Preferably, corner 62a is somewhat rounded, e.g., about 0.010 inch (250 μm), to minimize the risk of damage to face 50 from the mold. All of the surfaces 52, 54, 56, 58, 60, 62, 64 should be of optical quality.

While the front surface of rear portion 42 has been shown and described with four steps, it will be understood by one of skill in the art that more or fewer steps could be used. Usually, the maximum number of steps will be limited by the manufacturing technique being used, e.g., with injection molding the smallest individual step easily manufactured would have faces of about 0.001 inch (25 μm). The physical limit for the number of steps would usually be much smaller, somewhere around 10 times the wavelength of the light being used. Below that, significant diffraction effects would be likely to interfere with the light.

The rearmost part 70 of the rear portion 42 extends backwards in a substantially flat direction, i.e., the rear surface 72 along the part 70 is no longer angled. The bottom of the part 70 also is provided with a flange 74. The flange 74 and front face 48 are positioned accurately relative to the rear surface 52, so that positioning of them in the opening 76 formed in the base plate 12 will accurately position the entire prism structure 30.

In use, incident light will usually shine up along path A, pass through one of the horizontal faces of steps 54, 56, 58, 60, reflect off the angled surface 52, pass through one of the vertical faces of steps 54, 56, 58, 60, pass through the rear face 50, the front face 48, a hole 24 in the tape 22 and the window 36. As will be apparent, the path of the light ensures that all interaction with surfaces other than surface 52 is in the normal direction, minimizing spurious reflections. As will also be apparent, the light go through the system in the opposite direction, with the same minimization of spurious reflections.

While the steps 54, 56, 58, 60 have been shown as substantially square in cross-section, they need not be if the light path is not square. The important point is for each face the steps to be substantially normal to the light path entering and leaving it.

It is possible for light to pass unintentionally below the bottom edge of the tape 22 through region 80. To minimize interference from this, the lower parts of faces 35, 37 of the window 36 and/or faces 48, 50 of the front portion 40 can be frosted, edged, ribbed or otherwise made light diffusing. In addition, the leveling out of the rear surface 52 at 72 in the rear part 70 stops reflection of the light downward at this low part of the prism. Instead, light will enter through the lower portion of the vertical wall 60a, or the vertical wall 64, and simply pass through the rear part 70 without being reflected downward.

As will be apparent, the present design provides good reflection of the light beam in the desired directions, while minimizing the mass of material required in the main prism body 32. Sink marks are substantially eliminated since the total amount of plastic involved is dramatically smaller. Cycle time can be dramatically reduced, since only thin pieces of plastic are required.

Unfortunately, the cavity 66 may create some problems of its own. Specifically, the interior surfaces of the walls 46 will be much closer to the light path A than the exterior surfaces of the walls 46. With a solid prism, only the exterior surfaces would be likely to reflect stray light. With an interior surface, however, the interior surface may also reflect stray light. Frosting, such as that suggested in co-pending U.S. patent application Ser. No. 08/429,427 may be sufficient to eliminate this problem. However, it may not.

Figure 5:
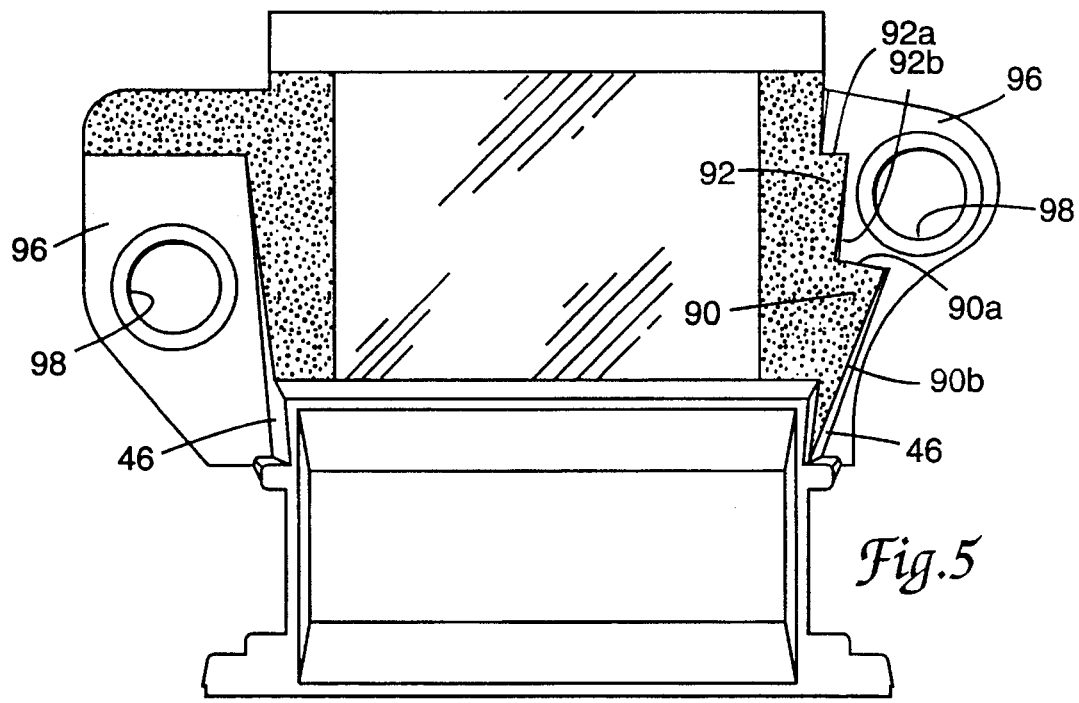
FIG. 5 is a top plan view of the prism of FIG. 4.

A further aspect of the present invention therefore provides additional prism structures to minimize this reflection. These structures are best seen in FIGS. 4 and 5. In FIG. 4, angled steps 80, 82, 84, 86 are provided on the inside surface of side 46. The steps 80, 82, 84, 86 can be provided on one or both of the walls 46, depending on likely locations of the light source. For example, if the light source is likely to be offset towards one side of the prism but not the other, steps 80, 82, 84, 86 on one side 46 might be sufficient. Each angled step 80, 82, 84, 86 preferably is angled such that the face 80a, 82a, 84a, 86a thereof closest to the tape is substantially normal to light coming from the tape hole 24. The angled face 80b, 82b, 84b, 86b of each step is roughly parallel to light coming from the tape hole 24. In this fashion, light can easily enter the angled steps 80, 82, 84, 86, but will be retained therein and unable to reflect back out. Preferably, the sides 80b, 82b, 84b, 86b are frosted to assist in this.

Turning to FIG. 5, similar steps 90, 92 preferably are provided on the exterior of side 46. In this case, the sides of the steps 90, 92 are such that the short surface 90a, 92a are roughly normal to the direction of the light so that the light will pass therethrough, while the longer sides 90b, 92b roughly parallel the light to prevent it exiting therethrough. As with internal angled steps 80, 82, 84, 86, external steps 90, 92 can be provided on either or both of sides 46. In addition, as shown in the drawings, the number of internal and external steps need not be the same. Preferably, angled sides 90b, 92b are frosted.

As will be apparent to one of skill in the art, the use, number, size and exact angles of the various internal and external steps 80, 82, 84, 86, 90, 92 will vary depending on the exact design of the prism to be used. In addition, it will be apparent that the surfaces of the external angled steps 90, 92, as well as any other surfaces of the prism through which light transmission is not desired, could be frosted, ribbed or otherwise made non-light transmitting.

Preferably, surface 52 is slightly curved, as shown in greatly exaggerated form by the phantom line 52' in FIG. 2. This slight curvature will help to refocus the light beam as it passes toward the photodetector. Ideally, the portion of the curve 52' which would be tangent to the surface 52 is aligned with the hole 24, to optimize this effect.

Finally, as best seen in FIGS. 4 and 5, flanges 96 may be provided on either side of the sides 46 with post holes 98 formed therein. These post holes 98 can be used with suitable posts 100 (see FIG. 2) in the cartridge 10 to help position the prism in the cartridge.

Figure 6:
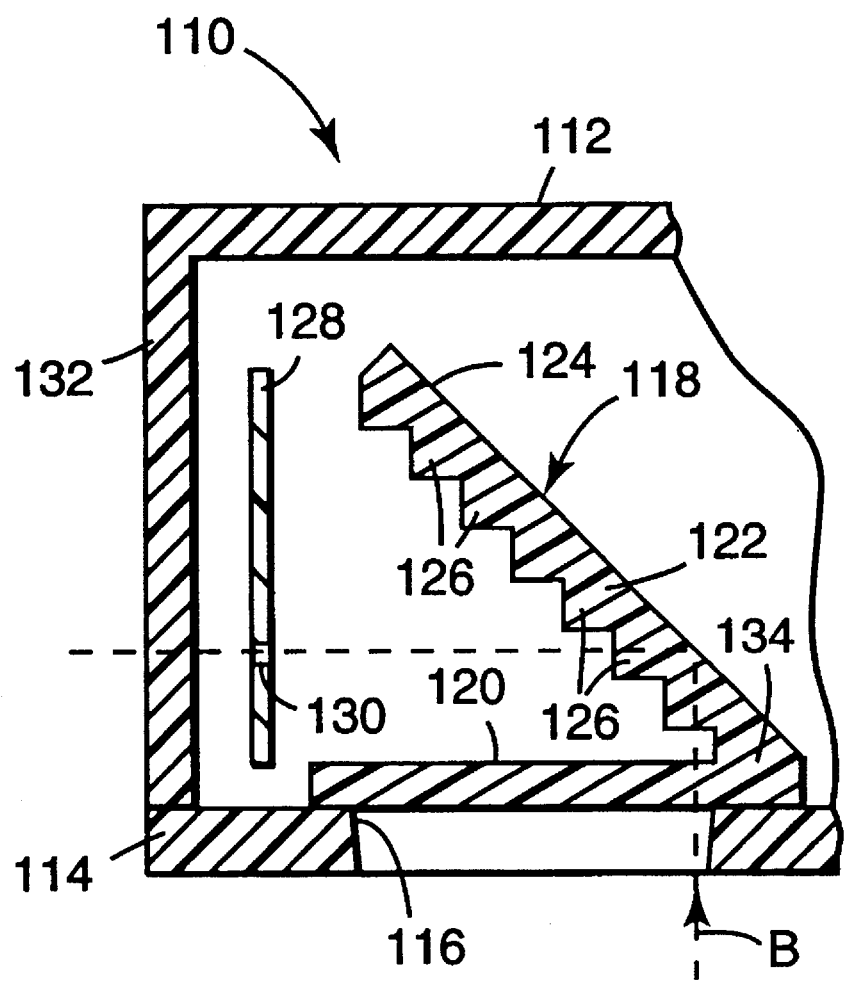
FIG. 6 is a cross-sectional view similar to FIG. 2 of a second embodiment of a data cartridge according to the present invention.

FIG. 6 depicts a view analogous to FIG. 2 of an alternative embodiment of a reflecting device according to the present invention, which uses the step concept with a mirror instead of a prism. In this embodiment, a cartridge 110 has a transparent cover 112 and baseplate 114 with a window 116 formed in the baseplate 114. The reflecting device is a mirror 118 having a first portion 120 and a second portion 122. The first portion 120 is mountable to the baseplate 114 in or above the window 116. Preferably, the first portion closes off the window 116. The second portion 122 has an external face 124 which is angled at greater than the critical angle to the incident light path B, preferably about 45°, and may be silvered if desired. The internal face of the mirror 120 is formed by a plurality of steps 126, in much the same fashion as the internal steps 54, 56, 58, 60 of the prism 32 of the first embodiment. The surfaces of the window 116, the steps 126 and the external face 124 are optical quality surfaces.

Light will pass through the first portion 120, through one side of a step 126, be reflected by external face 124, exit through another side of a step 126, pass through a hole 130 in tape 128 and exit through the front 132 of the transparent cover 112. All interactions with surfaces other than external face 124 are substantially normal to the surface, minimizing undesired reflections.

As will be apparent to one of skill in the art, the lower portions of the front 132 of the cover 112 can be frosted to prevent light transmission under the tape 128, and the shape of the back end 134 of the mirror can also be adapted to minimize reflection from this source, in much the same fashion as in the first embodiment. The external surface 124 also can be made slightly concave, like surface 52'.

It will be understood that these exemplary embodiments in no way limit the scope of the invention. Other modifications of the invention will be apparent to those skilled in the art in view of the foregoing description. For example, the invention has been described with respect to triangular prisms and mirror, but could be applied to non-triangular prisms and mirrors. These descriptions are intended merely to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

We claim:

1. A reflecting device for a data cartridge for use in a drive having a main incident light path axis, the device having:
   a) a transparent main body comprising:
      i) a first portion having an external face, an internal face substantially parallel to the external face and at least a first end, both the internal and external faces being substantially normal to the light path axis when the reflecting device is positioned in a drive;
      ii) a second portion having an external face, an internal face and at least a first end, the first end of the first portion being contiguous to the first end of the second portion, and the external face of the second portion being angled at greater than the critical angle to the light path axis when the reflecting device is positioned in a drive; and
      iii) a plurality of steps formed on the internal face of the second portion, each step having a first face substantially perpendicular to the main incident light path axis when the reflecting device is positioned in a drive, and an adjacent second face substantially parallel to the main incident light path axis when the reflecting device is positioned in a drive;
   b) a bridge portion extending outwardly from the main body contiguous to the first end of the first portion; and
   c) a transparent window portion spaced from the main body and extending downwardly from the bridge portion substantially parallel to the faces of the first portion.

2. The device of claim 1, wherein the first portion has a second end opposite from the first end, and a part of at least one of the internal and external faces of the first portion and the first end of the external face of the second portion is frosted adjacent the second end to be diffusing.

3. The device of claim 1, wherein the external face of the second portion is angled about 45° to the light path axis when the reflecting device is positioned in a drive.

4. The device of claim 1, wherein the external face of the second portion is slightly concave.

5. The data cartridge of claim 1, wherein the external face of the second portion of the reflective device is slightly concave.

6. A reflecting device for a data cartridge for use in a drive having a main incident light path axis, the device having a transparent main body comprising:
   a) a first portion having an external face, an internal face substantially parallel to the external face, two edges and at least a first end, both the internal and external faces being substantially normal to the light path axis when the reflecting device is positioned in a drive;

b) a second portion having an external face, an internal face, two edges and at least a first end, the first end of the first portion being contiguous to the first end of the second portion, and the external face of the second portion being angled at greater than the critical angle to the light path axis when the reflecting device is positioned in a drive; and c) a plurality of steps formed on the internal face of the second portion, each step having a first face substantially perpendicular to the main incident light path axis when the reflecting device is positioned in a drive, and an adjacent second face substantially parallel to the main incident light path axis when the reflecting device is positioned in a drive;

d) two sides, each side having an internal face and an external face, end extending between and connecting the side edges of the first and second portions, the first and second portions and the sides defining a cavity therebetween; and e) a plurality of steps formed on at least one face of at least one side, each step having a first face which is substantially perpendicular to a path of light diffusing from the main incident light path axis toward the step when the reflecting device is positioned in a drive, and an adjacent second face substantially parallel to the path of light diffusing from the main incident light path axis toward the step when the reflecting device is positioned in a drive.

7. The device of claim 6, wherein pluralities of such steps are formed on both the internal and external faces of at least one of the sides.

8. A data cartridge for use in a drive having a main incident light path axis, the data cartridge comprising:

a) a main base plate having a base plate window formed therein;

b) a cover having top, front, right, left and back sides arranged generally in a rectangular configuration and mounted to the main base plate to define a data cartridge shell; and c) a reflective device mounted inside the data cartridge shell contiguous to the base plate window, the device having:

i) a transparent main body comprising:

A) a first portion having an external face, an internal face substantially parallel to the external face and at least a first end, both the internal and external faces being substantially normal to the light path axis when the reflecting device is positioned in a drive;

B) a second portion having an external face, an internal face and at least a first end, the first end of the first portion being contiguous to the first end of the second portion, and the external face of the second portion being angled at greater than the critical angle to the light path axis when the reflecting device is positioned in a drive; and C) a plurality of steps formed on the internal face of the second portion, each step having a first face substantially perpendicular to the main incident light path axis when the reflecting device is positioned in a drive, and an adjacent second face substantially parallel to the main incident light path axis when the reflecting device is positioned in a drive;

ii) a bridge portion extending outwardly from the main body contiguous to the first end of the first portion; and iii) a transparent window portion spaced from the main body and extending downwardly from the bridge portion substantially parallel to the faces of the first portion.

9. The data cartridge of claim 8, wherein the first portion has a second end opposite from the first end, and the transparent window has internal and external faces and an end opposite from the bridge portion, and a part of at least one of the internal and external faces of the first portion adjacent the second end and the internal and external faces of the transparent window adjacent its end is frosted to be diffusing.

10. The data cartridge of claim 8, further comprising tape contained within the data cartridge and extending between the main body of the reflective device and the window portion.

11. The data cartridge of claim 8, wherein the first portion and the second portion of the reflective device each have two side edges, and wherein the reflective device further comprises two sides, each side extending between and connecting side edges of the first and second portions.

12. The data cartridge of claim 11, wherein the first and second portions and the sides engage and substantially close the base plate window.

13. The data cartridge of claim 12, wherein pluralities of such steps are formed on both the internal and external faces of at least one of the sides of the reflective device.

14. The data cartridge of claim 11, wherein each side of the reflective device has an internal face and an external face, and a plurality of steps are formed on a least one face of at least one such side, each step having a first face which is substantially perpendicular to a path of light diffusing from the main incident light path axis toward the step when the data cartridge is positioned in a drive, and an adjacent second face substantially parallel to the path of light diffusing from the main incident light path axis toward the step when the data cartridge is positioned in a drive.

15. The data cartridge of claim 8, wherein the external face of the second portion of the reflective device is angled about 45° to the light path axis when the data cartridge is positioned in a drive.

* * * * *